US006927772B2

(12) United States Patent
Page (10) Patent No.: US 6,927,772 B2
(45) Date of Patent: Aug. 9, 2005

(54) METHOD OF DISPLAYING DATA (76) Inventor: Jeremy Page, 6013 McDanial Rd., Cochranton, PA (US) 16314

( * ) Notice: Subject to any disclaimer, the term of this patent is extended or adjusted under 35 U.S.C. 154(b) by 409 days.

(21) Appl. No.: 10/163,769

(22) Filed: Jun. 5, 2002

(65) Prior Publication Data

US 2003/0227458 A1 Dec. 11, 2003

(51) Int. Cl.$^7$ .............................. G06T 11/20; G09G 5/00
(52) U.S. Cl. ......................................... 345/440; 345/419
(58) Field of Search ................................ 345/440, 834, 345/418, 419, 629; 713/161

(56) References Cited

U.S. PATENT DOCUMENTS

| | | | | |
|---|---|---|---|---|
| 4,616,262 A | * | 10/1986 | Toriumi et al. | 348/597 |
| 4,736,436 A | * | 4/1988 | Yasukawa et al. | 382/154 |
| 5,333,244 A | * | 7/1994 | Harashima | 345/419 |
| 5,557,716 A | * | 9/1996 | Oka et al. | 345/440 |
| 5,801,680 A | * | 9/1998 | Minakuchi | 345/589 |
| 5,982,383 A | * | 11/1999 | Kumar et al. | 345/440 |
| 5,986,673 A | * | 11/1999 | Martz | 345/649 |
| 6,023,261 A | * | 2/2000 | Ugajin | 345/634 |
| 6,170,681 B1 | * | 1/2001 | Yoshimatsu | 212/278 |
| 6,201,550 B1 | * | 3/2001 | Sakamoto | 345/442 |
| 6,285,367 B1 | * | 9/2001 | Abrams et al. | 345/854 |
| 6,320,517 B1 | * | 11/2001 | Yano et al. | 340/995.15 |
| 6,343,508 B1 | * | 2/2002 | Feller | 73/159 |
| 6,359,635 B1 | * | 3/2002 | Perttunen | 345/834 |
| 6,390,508 B2 | * | 5/2002 | Levine | 283/115 |
| 6,429,862 B1 | * | 8/2002 | Teramoto | 345/419 |
| 6,430,431 B1 | * | 8/2002 | De Yoe | 600/410 |
| 6,448,987 B1 | * | 9/2002 | Easty et al. | 345/834 |
| 6,466,211 B1 | * | 10/2002 | Havre et al. | 345/440 |
| 6,549,219 B2 | * | 4/2003 | Selker | 345/834 |
| 6,577,319 B1 | * | 6/2003 | Kashiwagi et al. | 345/581 |
| 6,618,170 B1 | * | 9/2003 | Whiting et al. | 358/1.9 |
| 2002/0018064 A1 | * | 2/2002 | Hatanaka et al. | 345/427 |
| 2002/0122072 A1 | * | 9/2002 | Selker | 345/834 |
| 2003/0083073 A1 | * | 5/2003 | Cossins et al. | 455/446 |

FOREIGN PATENT DOCUMENTS

| | | | | |
|---|---|---|---|---|
| CH | 690517 | * | 9/2000 | G04B/19/28 |
| JP | 10-208068 | * | 8/1998 | G06T/11/20 |

OTHER PUBLICATIONS

"The Visual Display of Quantitative Information", Edward R. Tufte, 1983, Graphics Press, p. 108–109.*

* cited by examiner

Primary Examiner—Ryan Yang
(74) Attorney, Agent, or Firm—Richard K Thomson (57) ABSTRACT Data is reduced to a graphic representation by have a core value which is wrapped by an annulus of a related value, the thickness of the annulus and the base diameter of the core representative of the magnitudes of the data being represented. A third data family can be represented by depiction being selected from a group consisting of a segment of said first core circle, a segment of said first annulus, and a second independent annulus concentric with said first annulus depending on whether said third variable is a) more closely related to said first variable, b) more closely related to said second variable, or c) is an independent, stand alone variable, respectively. A sequence of graphic depictions representing pie charts at successive time periods can be interconnected and smoothed to form a 3-D surface of revolution.

4 Claims, 8 Drawing Sheets

METHOD OF DISPLAYING DATA

BACKGROUND AND SUMMARY OF THE INVENTION

The present invention is directed to a method of graphically displaying data. More particularly, the present invention is directed to a method of graphically displaying multiple sets of data in the same geometric figure with the multiple sets being clearly delineated, such as debit and credit data sets, to enable the full financial picture to be concisely depicted.

With the recent proliferation of information, new ways to display that information in data sets are needed. The method of the present invention permits the visual display of multiple (two or more) sets of data as a geometric figure, the method comprising depicting at least one first value of a first variable as a first core circle of a first size; depicting at least one second value of a second variable as a first annulus of a second size surrounding said first core circle, a ratio of said second size of the first annulus to the first size of said first circle being equal to a value selected from i) a ratio of a second area of the first annulus to an area of the core circle, and ii) a ratio of an outer diameter of the first annulus to an outer diameter of the core circle.

The method further comprises depicting a value of at least a third variable, that depiction being selected from a group consisting of a segment of the first core circle, a segment of the first annulus, and a second independent annulus outside the first annulus, depending on whether the third variable is a) more closely related to the first variable, b) more closely related to the second variable, or c) is an independent, stand alone variable, respectively. The third variable can be a stand alone variable with a difference in inner diameters of said first and second annuluses representing a differential in values represented by said two annuluses. For example, a first one of the first and second annuluses can represent revenue and a second one of said first and second annuluses can represent expenses with the differential representing net income/loss. The method further contemplates stacking a series of the geometric figures and smoothing an outer surface formed thereby to form a three dimensional representation of the depicted values, each slice of the three dimensional representation delineating a snapshot in time of the depicted values.

Various other features, advantages and characteristics of the present invention will become apparent after a reading of the following detailed description.

BRIEF DESCRIPTION OF THE DRAWINGS

The preferred embodiment(s) of the present invention are described in conjunction with the associated drawings in which like features are indicated with like reference numerals and in which.

DETAILED DESCRIPTION OF PREFERRED EMBODIMENT(S)

Figure 1A:
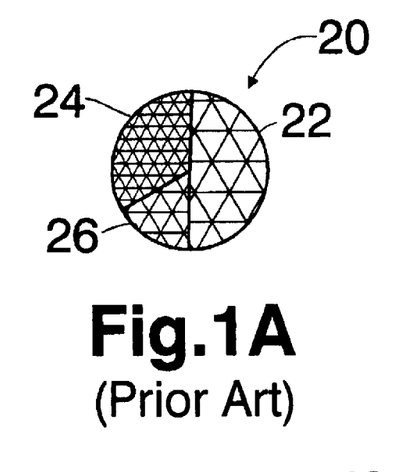
FIG. 1A is a depiction of a prior art presentation of asset data.
Figure 1B:
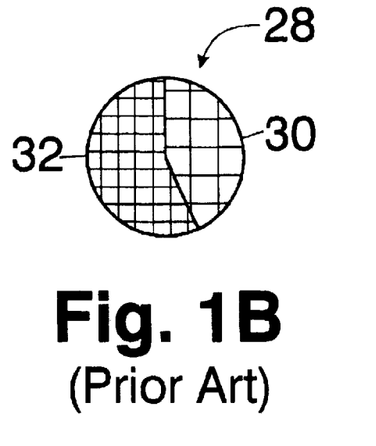
FIG. 1B is a depiction of a prior art presentation of liability data.
Figure 1C:
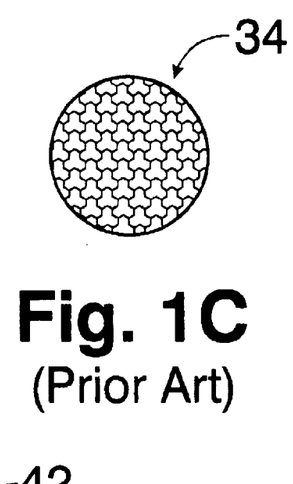
FIG. 1C is a depiction of a prior art presentation of equity data.
Figure 1D:
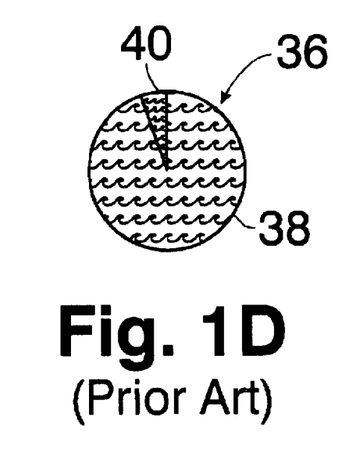
FIG. 1D is a depiction of a prior art presentation of revenue data.
Figure 1E:
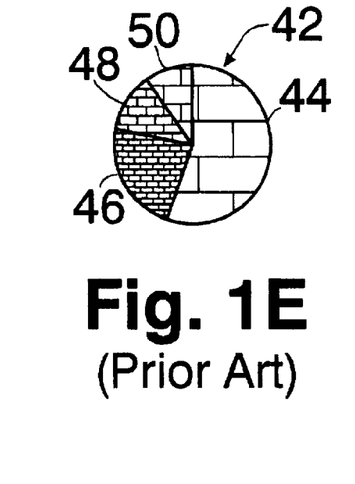
FIG. 1E is a depiction of a prior art presentation of expense data.

As shown in FIGS. 1A–1E, various prior art methods of depicting financial (or other numerical) data using individual pie charts. In FIG. 1A, pie chart 20 graphs the assets including cash 22, property 24, and machinery 26. In FIG. 1B, pie chart 28 graphs liabilities, short-term liabilities shown as segment 30 and long-term liabilities as segment 32. In FIG. 1C, equity is depicted as circle 34. In FIG. 1D, revenue 36 is made up of sales revenue 38 and interest revenue 40. Finally, in FIG. 1E, expenses 42 are broken down into, by way of example, salaries 44, supplies 46, vehicle 48, and repairs 50. These seemingly unrelated graphic depictions do nothing to increase the viewer's comfort level with the statistics or suggest to her/him any relationships between the data sets or graphs.

Figure 1F:
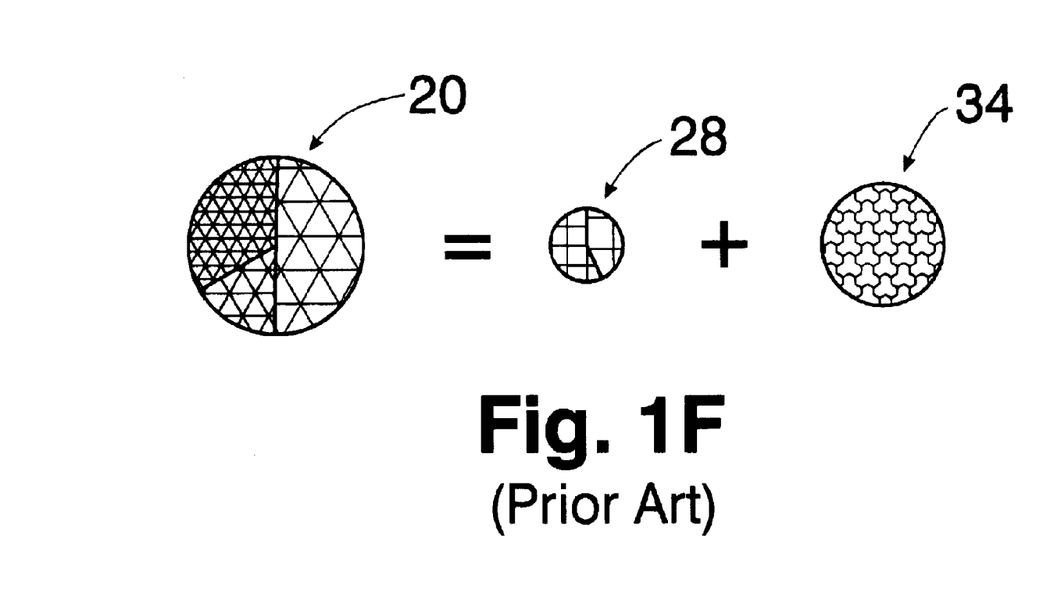
FIG. 1F is a prior art graphic depiction of a typical balance sheet with size as one of the variables.

A prior art graphic equation is shown in FIG. 1F showing that assets 20 are equal to liabilities 28 plus equity 34. While this graphic depiction attempts to display a relationship between data sets known to be interrelated, the technique does little to make the data sets any more meaningful to the reader, nor does the depiction method suggest more than a token relationship between the data sets.

Figure 2A:
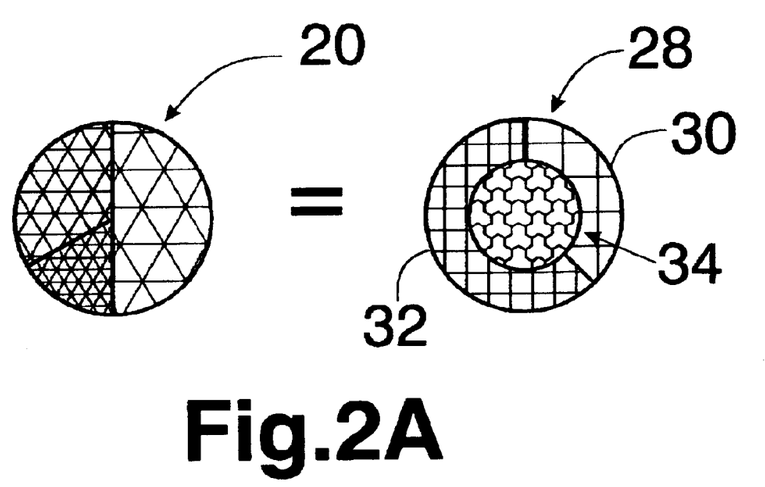
FIG. 2A is a first embodiment of the method of the present invention for a balance sheet.

The method of displaying data of the present invention overcomes these difficulties and helps a viewer understand how numerical sets of data are interrelated. As shown in a first embodiment of the method of the present invention in FIG. 2A, the method is used to display a balance sheet where liabilities 28 which are comprised of short-term liabilities 30 and long-term liabilities (i.e., mortgages) 32 are transformed into an annular chart which encircles equity 34. Using this technique, the balance sheet becomes a simple relationship equating the assets 20 in a first integral graphic form to the liabilities 28 and equity 34 in a second integral graphic form. The diameter of core circle 34 has a first value and the diameter of the annulus 28 are related by a relationship selected from i) a ratio of a second area of the first annulus to an area of the core circle, and ii) a ratio of an outer diameter of the first annulus to an outer diameter of the core circle.

Figure 2B:
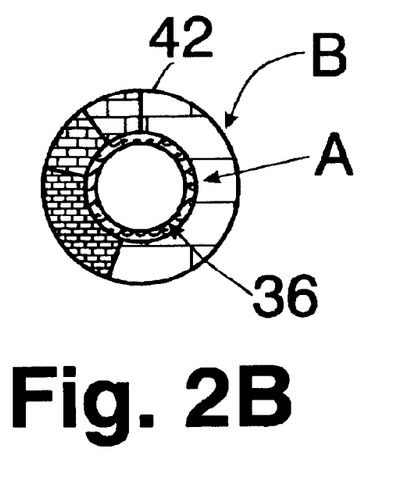
FIG. 2B is a second embodiment of the method of the present invention depicting an income statement.

In FIG. 2B, a second embodiment of the method of the present invention depicts the method being used with an income statement. In this embodiment, revenues 36 are shown in a first donut pie chart A and expenses 42 in a second donut B. The outer diameters of donuts A and B are the same while the inner diameters are ratioed to show the difference in the values represented by donuts A and B. The donuts A and B can be superposed with the overlap between the donuts, which represents the differential between these values, graphically shown in a distinctive way, i.e., green for positive, red for negative, to show bottom line results, profit or loss. Obviously, various hatching techniques can be used for black and white depictions, as well.

Figure 3:
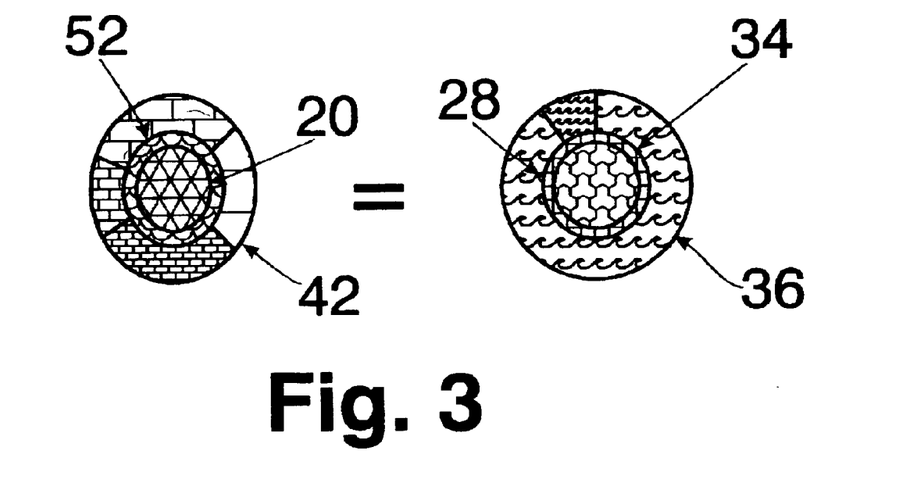
FIG. 3 is a third embodiment of the present invention depicting, in a single financial status equation, both the balance sheet and the income statement.

Typically, two different graphic depictions will be needed: a first display to show the debit side of the trial balance (assets, cost of goods sold or COGS, and operating expenses) and a second display for the credit side (liabilities, equity, and revenue). As shown in FIG. 3, these two graphs can be formed by forming a core circle of assets 20 or equity 34, and then wrapping the core circle with COGS 52 and operating expenses 42 or liabilities 28 and revenue 36, respectively. These two donut pie charts combine the information shown on an income statement and a balance sheet in a way that shows the interrelationships between the elements of the sets of data.

Figure 4A:
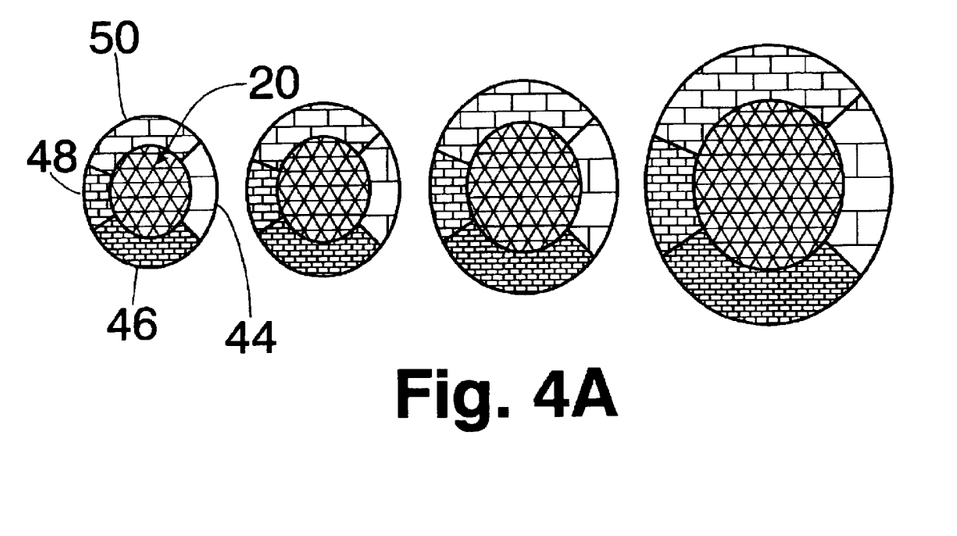
FIG. 4A shows four financial debit status charts for successive time periods.
Figure 4B:
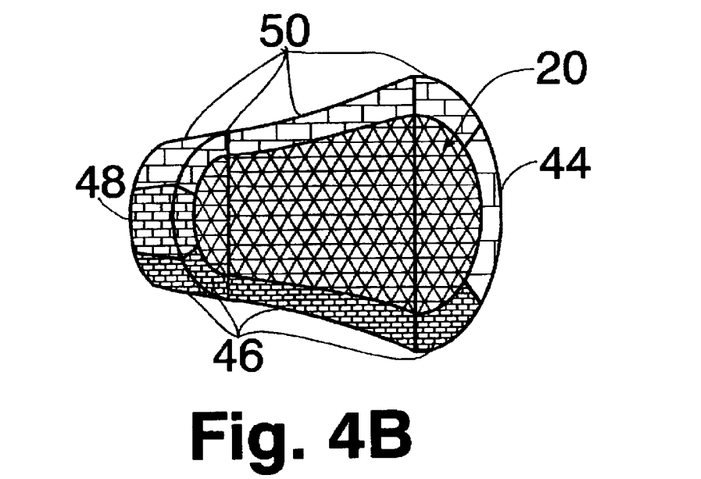
FIG. 4B depicts a fourth embodiment of the present invention whereby the outer peripheries of the four financial status charts are smoothed into a single three dimensional geometric figure.

It would be possible to display such donut pie charts for credit and debit sides of the ledger for successive periods of time, each year, for example. FIG. 4A depicts four successive periods in which the entity in question, a company for example, experienced steady growth. The center ring has been omitted for clarity. It is proposed to think of these donut charts as rings of a tree, to turn them sideways so they share a common central axis, and then the edges are smoothed into an external surface forming a resulting three dimensional object of revolution which is a three dimensional representation of the displayed values. In FIG. 4B, a section has been cut away in order to show internal details. The resulting chart has been termed a "Super pie" chart or "Spie" chart for short.

Figure 5A:
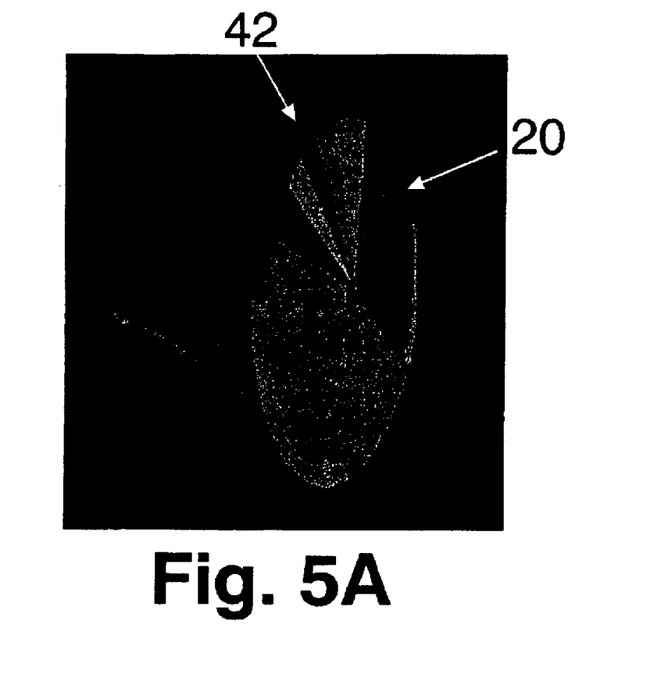
FIG. 5A shows the use of the fourth embodiment to depict debit financial results for Company A.
Figure 5B:
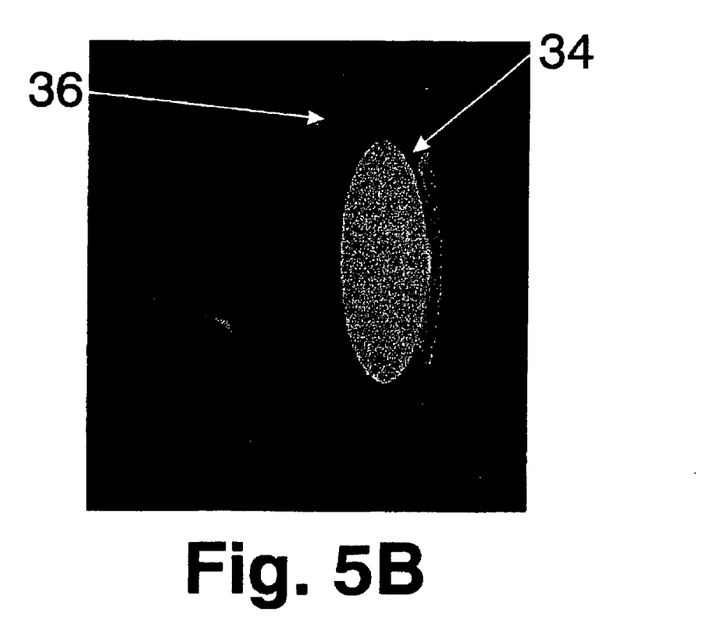
FIG. 5B shows the use of the fourth embodiment to depict credit financial results for Company A.

By way of example, three companies' credit and debit numbers are displayed using this fourth embodiment in FIGS. 5A & B, 6A & B, and 7A & B. For the first company, Company A, the cost of goods sold was not available. Accordingly, FIG. 5A shows operating expenses 42 wrapped around assets 20 (which are each broken up into various component parts). FIG. 5B shows the debit side of the ledger, namely, equity 34 wrapped by an inner cylinder of liabilities (omitted) and an outer cylinder of revenue 36. Even though the liabilities are omitted, the thickness of the missing annulus is representative of its magnitude.

Figure 6A:
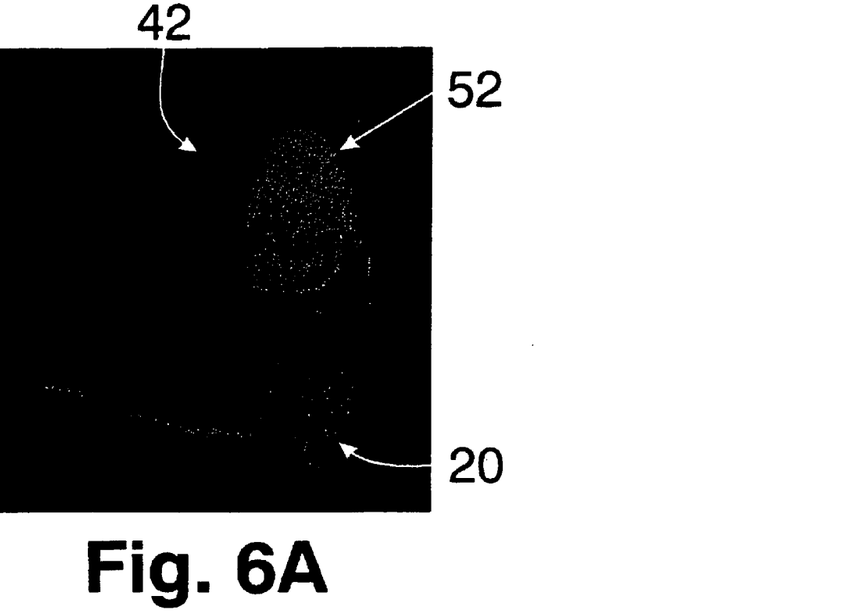
FIGS. 6A & B show the use of the fourth embodiment to depict debit and credit financial results, respectively, for Company B.
Figure 6B:
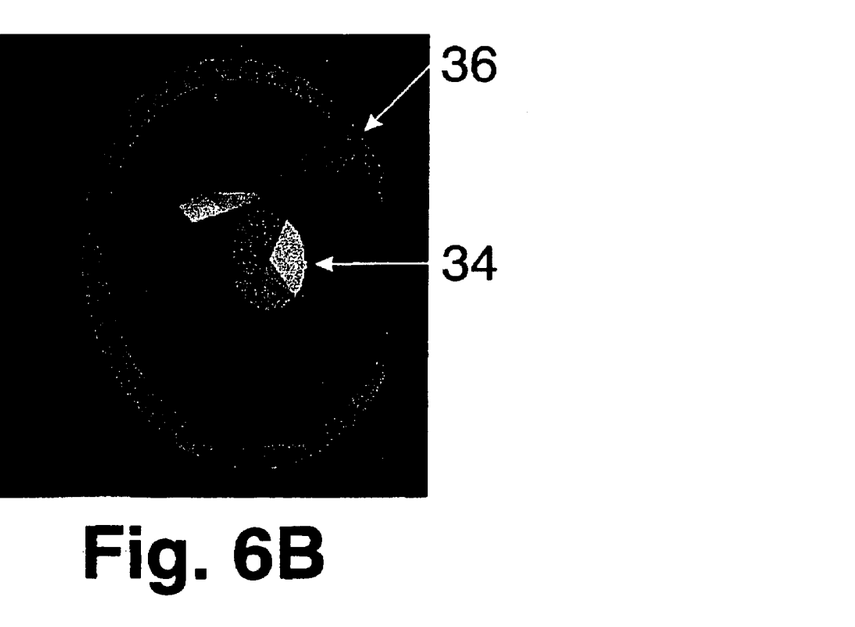

FIGS. 6A & B and 7A & B show the debit and credit sides of the ledger for two other companies, Company B and Company C, respectively. Company B had fairly steady growth over the five year period depicted in the Spie chart with operating expenses 42 wrapped around COGS 52 around the core value assets 20 depicted in a plurality of components. In FIG. 6B, revenues 36 that were multiple times its equity 34 and liabilities have been omitted in this graph to permit features which would have been hidden to be shown. It will be appreciated that the magnitude of the omitted liabilities for Company B is significantly greater than that for Company A.

Figure 7A:
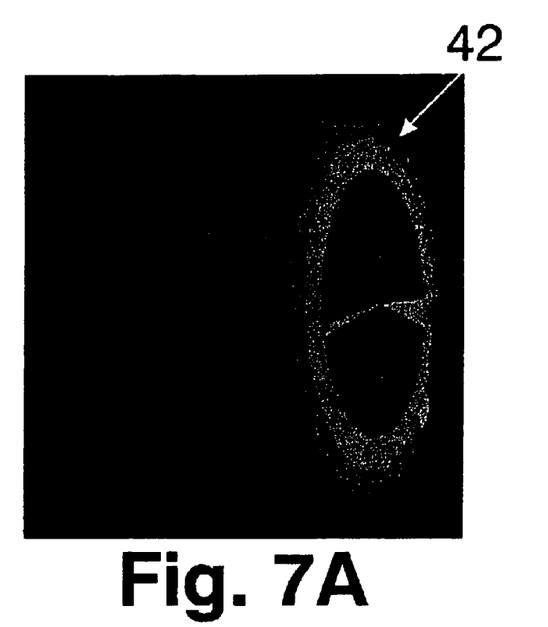
FIGS. 7A & B show the use of the fourth embodiment to depict debit and credit financial results, respectively, for Company C.
Figure 7B:
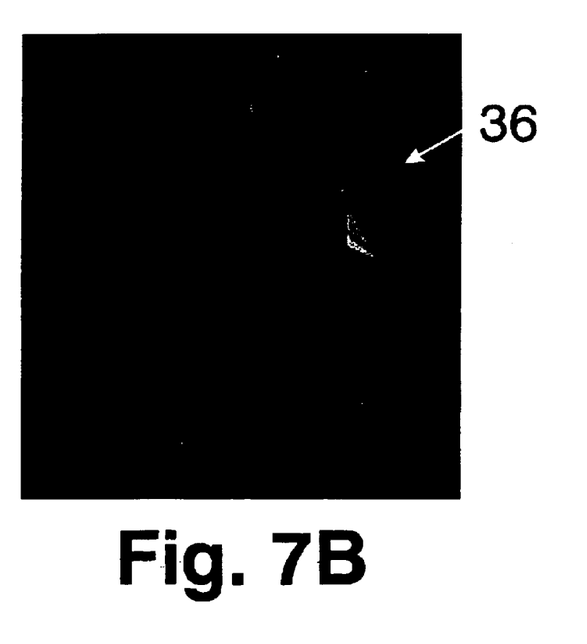

FIGS. 7A and 7B show the balance sheet and income statement Spies for a third company. The simultaneous increases in operating expenses 42 and revenues 36 at the same historic time period suggests an acquisition or bond issue. By checking the financial statement of the company, the user can verify whether an acquisition or bond issue was made during that time period.

These three sets of figures show the flexibility of this fourth embodiment of the invention and demonstrate its effectiveness in creating graphic representations of financial data for companies that reflect the wide variations in financial performance of those companies as well as track the year-to-year performance of a particular company. These graphs are not intended to replace the financials but, rather, are intended to be implemented as graphic tools which, when used with the financial balance sheets, help the user make sense of the numerical data.

Typically, the innermost values, equity and assets, tend to be relatively stable, as do the first donuts COGS and liabilities. Should an anomaly occur that is worthy of note, a breakaway or cross section of the three dimensional graph could be created to allow the anomaly to be displayed and explained or, one of these steady values omitted, as has been done with liabilities in FIG. 6B.

Various changes, alternatives and modifications will become apparent to a person of ordinary skill in the art following a reading of the foregoing specification. It is intended that all such changes, alternatives and modifications as fall within the scope of the appended claims be considered part of the present invention.

I claim:

1. A method of visually displaying a change in relationships over time between at least two interrelated variables which change over time as a three dimensional geometric figure, the method comprising forming a two dimensional geometric figure by
   a. depicting a first value of a first interrelated variable which changes over time at a first particular moment in time as a first core circle of a first size;
   b. depicting a second value of a second interrelated variable which changes over time at said first particular moment in time as a first annulus of a second size surrounding said first core circle, a ratio of said second size of said first annulus to said first size of said first circle being equal to a value selected from
      i) a ratio of a second area of said first annulus to an area of said core circle, and
      ii) a ratio of an outer diameter of said first annulus to an outer diameter of said core circle; then,
   c. producing a sequence of said two dimensional geometric figures representative of said at least two variables at specific successive moments in time;

d. stacking said sequence of geometric figures seriatim;

e. smoothing an external surface of a resulting three dimensional object of revolution to form a three dimensional representation of said changes in said interrelated variables over time.

2. The method of claim 1 further comprising depicting a change in value of at least a third variable, that value being depicted by one selected from a group consisting of i) a segment of said first core circle, ii) a segment of said first annulus, and iii) a second independent annulus concentric with said first annulus depending on whether said third variable is a) more closely related to said first variable, b) more closely related to said second variable, or c) is an independent, stand alone variable, respectively, said change in value over time being depicted in said three dimensional object.

3. The method of claim 2 wherein said third variable is a stand alone variable with a difference in inner diameters of said first and second annuluses representing a differential in values represented by said two annuluses.

4. The method of claim 3 wherein a first one of said first and second annuluses represents revenue and a second one of said first and second annuluses represents expenses and said differential represents net income/loss.

* * * * *